United States Patent [19]

De Haeck

[11] 4,036,671

[45] July 19, 1977

[54] FLUX FOR THE SUBMERGED ARC WELDING OF ORDINARY, SEMI-ALLOYED OR SPECIAL STEELS

[75] Inventor: Robert Jean De Haeck, St. Pieters-Kapelle, Belgium

[73] Assignee: La Soudure Electrique Autogene, Procedes Arcos, S.A., Brussels, Belgium

[21] Appl. No.: 676,473

[22] Filed: Apr. 13, 1976

[30] Foreign Application Priority Data

Apr. 14, 1975 Belgium .................. 155372

[51] Int. Cl.$^2$ ............................ B23K 35/34
[52] U.S. Cl. .......................... 148/24; 148/26
[58] Field of Search .................... 148/24, 26

[56] References Cited

U.S. PATENT DOCUMENTS

| 2,803,740 | 8/1957 | Hyink | 148/26 |
|---|---|---|---|
| 3,201,292 | 8/1965 | Miltschitzky | 148/26 |
| 3,305,408 | 2/1967 | Dick | 148/26 |
| 3,320,100 | 5/1967 | Coless | 148/26 |
| 3,328,212 | 6/1967 | Coless | 148/26 |
| 3,551,217 | 12/1970 | Coless | 148/26 |
| 3,932,200 | 1/1976 | Miyano | 148/26 |

FOREIGN PATENT DOCUMENTS

| 2,316,356 | 11/1973 | Germany | 148/26 |
|---|---|---|---|
| 1,339,800 | 12/1973 | United Kingdom | 148/26 |
| 1,172,288 | 1/1969 | United Kingdom | 148/26 |
| 1,138,974 | 1/1969 | United Kingdom | 148/26 |
| 1,080,337 | 8/1967 | United Kingdom | 148/26 |
| 1,273,825 | 5/1972 | United Kingdom | 148/26 |

*Primary Examiner* — Peter D. Rosenberg
*Attorney, Agent, or Firm* — Alexis Barron

[57] ABSTRACT

Flux for welding ordinary, semi-alloyed, alloyed or special steels with a high rate of efficiency and high rate of speed and containing a relatively high amount of Fe powder.

8 Claims, No Drawings

FLUX FOR THE SUBMERGED ARC WELDING OF ORDINARY, SEMI-ALLOYED OR SPECIAL STEELS

FIELD OF THE INVENTION

The present invention relates to fluxes for submerged arc welding of ordinary, semi-alloyed, alloyed or special steels, characterised by a high efficiency and a relatively high rate of forward speed.

The submerged arc welding process is widely employed in automatic welding by reason of the high speeds of production of welds achieved at the high amperages which this process makes it possible to use.

REPORTED DEVELOPMENTS

The specific characteristics of the submerged arc welding process are inter alia a function of the composition of the fluxes employed.

For example, in the range of basic or neutral fluxes, beads of considerable thickness having high tensile strength and/or high hardness levels are obtained at rates of speed of 50 cm/min with the fluxes and wires described in Belgian Pat. Nos. 680,280 to 680,284. The fluxes described in German Pat. No. 2,316,356 and Belgian Pat. No. 807,734 make it possible to reach rates of speed of as much as 135 cm/min.

However, such fluxes are characterised by outputs of approximately 100. The term "output" means the weight of weld metal in kg deposited per 100 kg of welding wire.

The object of the present invention is to obtain higher rates of output, of as much as about 200:
  at high rates of fusion (up to about 25 kg/hr) for a given arc power or conversely the use of low power for the deposition of large beads (and thus a reduction in the zone of thermal influence); and
  at rates of speed of the order of 200 cm/min.

SUMMARY OF THE INVENTION

The aforementioned object and other advantages are attained by incorporating into basic fluxes relatively large quantities of iron-based powder. It has been possible to achieve the desired characteristics by using compositions of flux comprising:
  considerable quantities (about 40 to about 70%) of Fe powder;
  high levels (about 10 to about 30%) of calcium fluoride ($CaF_2$); and
  unexpectedly, a wide variety of both alkaline and metal oxides provided the following condition is satisfied:

$$\frac{\% \ CaF_2 + \% \ CaO + \% \ MnOSiO_2}{\% \ of \ other \ powders \ (to \ the \ exclusion \ of \ Fe \ powder)} > 1.3.$$

("%" as used herein means weight percent.)

Also in accordance with this invention, and as will be explained in detail below, welds having particularly desired mechanical characteristics such as toughness, hardness and tensile strength can be obtained by utilizing an iron alloy instead of iron powder or by utilizing a mixture of iron powder and iron alloy or by utilizing other alloys and/or materials in elemental form in admixture with iron powder and/or an iron alloy.

DETAILED DESCRIPTION OF THE INVENTION

The flux composition of the present invention comprises:
  A. about 40 to about 70% of iron powder;
  B. about 10 to about 30% of $CaF_2$;
  C. about 5 to about 15% of CaO;
  D. about 5 to about 14% of $SiO_2$;
  E. about 0.2 to about 9% of $Al_2O_3$;
  F. about 3 to about 10% of $ZrO_2$;
  G. about 3 to about 12% of $MnOSiO_2$;
  H. about 2 to about 7% of FeMn;
  I. about 2 to about 7% of FeSi;
  J. about 0.1 to about 1.3% of $Fe_2O_3$, FeO; and
  K. 0 to about 0.3 wt. % of $TiO_2$; and wherein the ratio:

$$\frac{\% \ CaF_2 + \% \ CaO + \% \ MnOSiO_2}{\% \ SiO_2 + \% \ Al_2O_3 + \% \ Fe_2O_3, FeO + \% \ TiO_2} > 1.3.$$
$$\% \ ZrO_2 + \% \ FeMn + \% \ FeSi$$

As mentioned above briefly, it is possible to formulate fluxes which will produce welds having one or more desired mechanical characteristics such as toughness, hardness and tensile strength by modifying the Fe powder portion of the flux. Instead of iron powder there can be used an iron alloy, or there can be used a mixture of iron powder and iron alloy. In addition, a portion of the iron powder and/or iron alloy can be replaced by one or more modifying constituents, including materials such as carbon and metals in elemental form and/or in alloy form. The following are examples of materials that can be used in forming an iron alloy or used as a modifying constituent: C, Mn, Si, Cr, Ni, Mo, Va, Nb, Co, W, Be, Zr, Al, Mg and Ca. It should be understood that there can be used a mixture of different iron alloys, a mixture of different modifying constituents in elemental form, and a mixture of different modifying constituents in alloy form and that mixtures of the aforementioned can also be used. When utilizing one or more materials to alloy iron and/or as modifying constituents, they should comprise no greater than about 45% of the iron-based portion of the flux composition.

The flux composition can be prepared conveniently by: (A) combining a relatively small amount of certain of the constituents prefused with manganese silicate (referred to herein as "prefused product" for convenience) with other of the constituents comprising the flux; and (B) then agglomerating the resulting mixture by blending therewith sodium or potassium silicate; and (C) thereafter drying and firing the resulting composition at a temperature within the range of about 450° to about 650° C. For example, the following commercially available prefused product can be used: 75% $MnOSiO_2$; 10% CaO; 4% $CaF_2$; 5% $Al_2O_3$; and 2% FeO; along with trace amounts of other materials. There can be combined with about 4 to about 16% of this prefused product other of the constituents comprising the flux, for example powdered iron, $ZrO_2$, FeMn, FeSi, $CaSiO_3$ (for example, as wollastonite) and additional $CaF_2$ and if desired, $TiO_2$ and additional $Al_2O_3$ (for example, as calcined bauxite containing 85% $Al_2O_3$). This mixture can be agglomerated by blending therewith sodium or potassium silicate in an amount of about 7 to about 15 g/100 g of the mixture. Thereafter, the agglomerated mixture can be dried and fired at a temperature within the aforementioned range. It should be understood that the flux can be prepared by other suitable methods.

EXAMPLES

The following are illustrative of the flux compositions within the scope of the present invention.

|  | Ex. No. 1 | Ex. No. 2 |
|---|---|---|
| Fe powder | 50% | 50% |
| Fluorspar (CaF$_2$) | 16 | 13 |
| Wollastonite (CaSiO$_3$) | 18 | 12 |
| Zr oxide | 6 | 6 |
| FeMn (low C about 85-90% Mn) | 4 | 4 |
| FeSi (45% Si) | 2 | 2 |
| Product prefused with manganese silicate* | 4 | 13 |
|  | 100% | 100% |

*Commercially available prefused powder mixture sold as F 31/7.000 and containing: 10% CaO; 4% CaF$_2$; 75% MnOSiO$_2$; 5% Al$_2$O$_3$; and 2% FeO; and trace amounts of other materials The use of fluxes of Examples Nos. 1 and 2 resulted in beads having mechanical characteristics (tensile strength, hardness, toughness) similar to those obtained with conventional fluxes used in submerged arc welding of ordinary, semi-alloyed, alloyed or special steels, but with efficiency ratings of 110 to 180 kg per 100 kg of wire and welding speeds (dependent upon the wires and parameters used) of as much as 200 cm/min.

I claim:

1. Powdered flux for submerged arc welding, with a high efficiency level, of ordinary, semi-alloyed, alloyed or special steels, comprising:
   A. about 40 to about 70% of (i) iron powder or (ii) one or more iron alloys or (iii) a mixture thereof, any alloying constituents comprising no greater than about 45% of ingredient (A);
   B. about 10 to about 30% of CaF$_2$;
   C. about 5 to about 15% CaO;
   D. about 5 to about 14% of SiO$_2$;
   E. about 0.2 to about 9% of Al$_2$O$_3$;
   F. about 3 to about 10% of ZrO$_2$;
   G. about 3 to about 12% of MnOSiO$_2$;
   H. about 2 to about 7% of FeMn;
   I. about 2 to about 7% of FeSi;
   J. about 0.1 to about 1.3% of Fe$_2$O$_3$.FeO; and
   K. 0 to about 0.3 wt. % of TiO$_2$; and wherein the ratio:

$$\frac{\% \text{ CaF}_2 + \% \text{ CaO} + \% \text{ MnOSiO}_2}{\% \text{ SiO}_2 + \% \text{ Al}_2\text{O}_3 + \% \text{ Fe}_2\text{O}_3.\text{FeO} + \% \text{ TiO}_2 + \% \text{ ZrO}_2 + \% \text{ FeMn} + \% \text{ FeSi}} \geq 1.3.$$

2. Powdered flux for submerged arc welding, with a high efficiency level, of ordinary, semi-alloyed, alloyed or special steels, comprising:
   A. about 40 to about 70% of a mixture of (i) iron powder, one or more iron alloys or an admixture thereof and (ii) one or more of C, Mn, Si, Cr, Ni, Mo, Va, Nb, Co, W, Be, Zr, Al, Mg or Ca in elemental or alloy form or a combination thereof, and wherein ingredient (ii) and any iron alloying constituents comprise no greater than about 45% of ingredient (A);
   B. about 10 to about 30% of CaF$_2$;
   C. about 5 to about 15% of CaO;
   D. about 5 to about 14% of SiO$_2$;
   E. about 0.2 to about 9% of Al$_2$O$_3$;
   F. about 3 to about 10% of ZrO$_2$;
   G. about 3 to about 12% of MnOSiO$_2$;
   H. about 2 to about 7% of FeMn;
   I. about 2 to about 7% of FeSi;
   J. about 0.1 to about 1.3% of Fe$_2$O$_3$.FeO; and
   K. 0 to about 0.3 wt. % of TiO$_2$; and wherein the ratio:

$$\frac{\% \text{ CaF}_2 + \% \text{ CaO} + \% \text{ MnOSiO}_2}{\% \text{ SiO}_2 + \% \text{ Al}_2\text{O}_3 + \% \text{ Fe}_2\text{O}_3.\text{FeO} + \% \text{ TiO}_2 + \% \text{ ZrO}_2 + \% \text{ FeMn} + \% \text{ FeSi}} \geq 1.3.$$

3. Powdered flux according to claim 1 in which ingredient (A) is said iron powder.

4. Powdered flux according to claim 1 in which ingredient (A) (i) is said iron powder.

5. In a submerged arc welding process for welding ordinary, semi-alloyed, alloyed or special steels in which a powdered flux is used, the improvement comprising utilizing the flux of claim 1.

6. In a submerged arc welding process for welding ordinary, semi-alloyed, alloyed or special steels in which a powdered flux is used, the improvement comprising utilizing the flux of claim 2.

7. In a submerged arc welding process for welding ordinary, semi-alloyed, alloyed or special steels in which a powdered flux is used, the improvement comprising utilizing the flux of claim 3.

8. In a submerged arc welding process for welding ordinary, semi-alloyed, alloyed or special steels in which a powdered flux is used, the improvement comprising utilizing the flux of claim 4.

* * * * *